J. M. FLOWER.
HARROW.
No. 181,660. Patented Aug. 29, 1876.
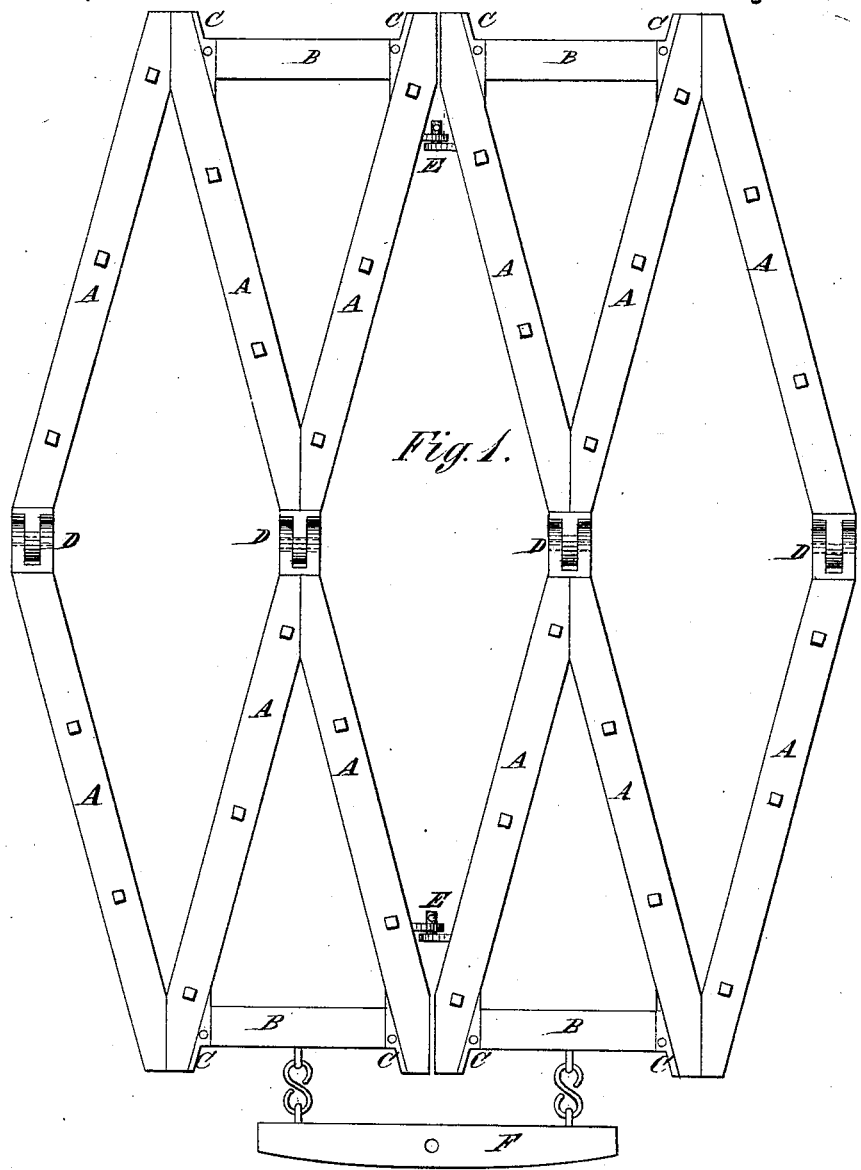

UNITED STATES PATENT OFFICE.

JAMES M. FLOWER, OF TRAVERSE CITY, MICHIGAN.

IMPROVEMENT IN HARROWS.

Specification forming part of Letters Patent No. 181,660, dated August 29, 1876; application filed July 1, 1876.

*To all whom it may concern:*

Be it known that I, JAMES M. FLOWER, of Traverse City, in the county of Grand Traverse and State of Michigan, have invented a new and useful Improvement in Harrows, of which the following is a specification:

Figure 1 is a top view of my improved harrow. Fig. 2 is a detail side view of one of the center hinges.

Similar letters of reference indicate corresponding parts.

The object of this invention is to furnish an improved harrow which shall be so constructed that the teeth may be wide apart, so that it will not clog with stones, sods, stubble, corn-stalks, &c., and which shall be simple in construction, light, strong, and durable, and effective in operation, pulverizing the soil very finely.

The frame of the harrow is made in four sections, each section being formed by arranging three bars, A, of suitable length and size, in the form of the letter N—that is to say, two of the bars are parallel, and are connected at their alternate ends or diagonally by the third bar. The bars A of each section are connected at one end by a cross or brace bar, B, the ends of which are secured in cast-iron sockets C, attached to the ends of the said bars A. The sections are connected together in pairs at their open ends by iron hinges D. One pair of the sections are turned over, and the two pairs are then connected together near their outer ends by iron hinges E, the cross-bars B thus forming the end bars of the harrow.

The teeth are inserted in the bars A, about eighteen inches apart, so that rubbish may easily find its way between, while, from the peculiar form of the frame A B, the paths of the teeth will be close together, and the soil will be very finely pulverized. To the cross-bars B, at either end, is attached a draw-bar, F, to which the double-tree is attached by a clevis, in the usual way.

By this construction the harrow will be exceedingly flexible, so that it will accommodate itself to any and every inequality of the surface of the ground.

Having thus described my invention, I claim as new and desire to secure by Letters Patent—

1. A harrow-frame formed of four sections, A B, each section consisting of three bars, A, arranged in the form of the letter N, and connected at one end by a cross-bar, B, substantially as herein shown and described.

2. The combination of the iron hinges D E with the four sections A B of the harrow, substantially as herein shown and described.

JAMES M. FLOWER.

Witnesses:
H. E. STEWARD,
E. W. STEWARD.